United States Patent [19]
Stone

[11] Patent Number: 5,835,146
[45] Date of Patent: Nov. 10, 1998

[54] VIDEO DATA COMPRESSION

[75] Inventor: Jonathan James Stone, Reading, United Kingdom

[73] Assignees: Sony Corporation, Tokyo, Japan; Sony United Kingdom Limited, Weybridge, England

[21] Appl. No.: 716,060

[22] Filed: Sep. 19, 1996

[30] Foreign Application Priority Data

Sep. 27, 1995 [GB] United Kingdom .................... 9519730

[51] Int. Cl.$^6$ ............................. H04N 7/12; H04N 11/02; H04N 11/04
[52] U.S. Cl. ............................................ 348/416; 348/407
[58] Field of Search ..................... 348/402, 407, 348/416, 417, 699, 412, 411, 415, 700; 358/136; H04N 7/12, 11/02, 11/04

[56] References Cited

U.S. PATENT DOCUMENTS

| | | | |
|---|---|---|---|
| 4,985,768 | 1/1991 | Sugiyama ............................... | 358/136 |
| 5,132,792 | 7/1992 | Yonemitsu et al. ..................... | 358/136 |
| 5,175,618 | 12/1992 | Ueda et al. ............................. | 358/412 |
| 5,227,878 | 7/1993 | Puri et al. ............................... | 358/136 |
| 5,517,246 | 5/1996 | Suzuki .................................... | 348/412 |
| 5,534,927 | 7/1996 | Shishikui et al. ....................... | 348/400 |
| 5,574,504 | 11/1996 | Yagasaki et al. ....................... | 348/412 |

FOREIGN PATENT DOCUMENTS

| | | |
|---|---|---|
| 577418 | 6/1993 | European Pat. Off. . |
| 658057 | 12/1994 | European Pat. Off. . |

*Primary Examiner*—Richard Lee
*Assistant Examiner*—Nhon T. Diep
*Attorney, Agent, or Firm*—Frommer Lawrence & Haug LLP; William S. Frommer

[57] ABSTRACT

A video data compression system in which input data representing at least portions of a picture can be encoded by generating motion data representing image motion between the picture and at least two different sets of one or more reference pictures. The system is operable to compare test data indicative of the sum of the quantity of motion data and quantity of error data required for encoding with respect to the sets of reference pictures, select the set of reference pictures for which the test data indicates the lowest sum, and use the selected set of reference pictures to encode the input data.

9 Claims, 4 Drawing Sheets

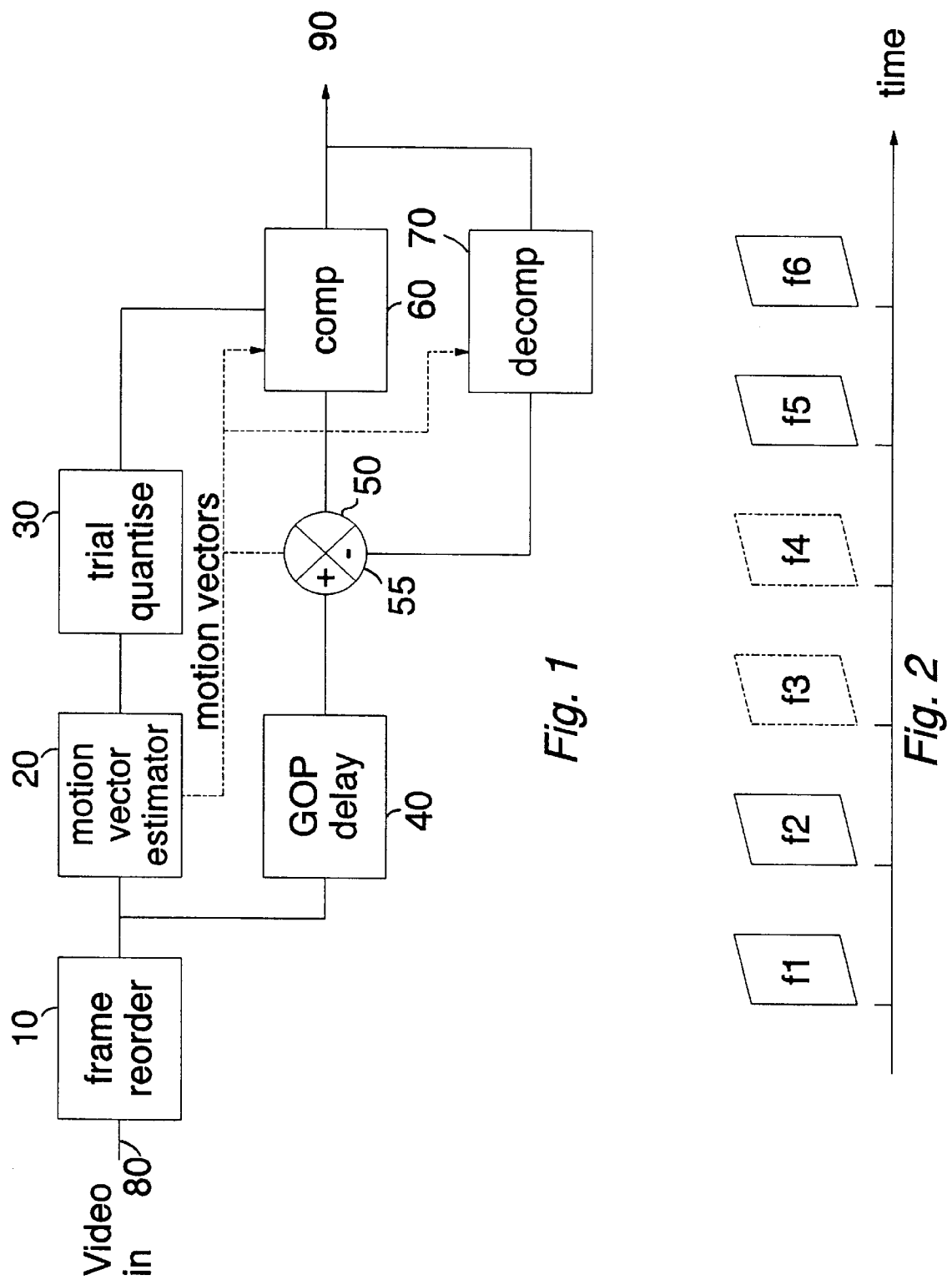

VIDEO DATA COMPRESSION

BACKGROUND OF THE INVENTION

1. Field of the Invention

This invention relates to video data compression.

2. Description of the Prior Art

Some video data compression systems, such as systems defined by the MPEG II standard[1], use a number of different coding techniques to encode successive pictures of a video signal.

[1] Motion Picture Experts Group II standard, described in the ISO/IEC publication DIS 13818/2, "Information technology—generic coding of motion pictures and associated audio information", March 1995, incorporated herein by reference.

Typically, the video signal is divided into successive groups of pictures (GOPs). Within each GOP at least one picture is encoded as an "I-picture", or intra-picture, using only information present in that picture itself. This means that I-pictures can later be decoded without requiring information from other pictures, and so provide random entry points into the video sequence. However, the converse of this is that the encoding of I-pictures cannot make use of the similarity between successive pictures, and so the degree of data compression obtained with I-pictures is only moderate.

Further pictures within each GOP may be encoded as "P-pictures" or predicted pictures. P-pictures are encoded with respect to the nearest previous I-picture or P-picture, so that only the differences between a P-picture and a motion-compensated previous P- or I-picture needs to be transmitted.

Finally, some of the pictures within a GOP may be encoded as "B-pictures" or bidirectional pictures. These are encoded with respect to two other pictures, namely the nearest previous I- or P-picture and the nearest following I- or P-picture. B-pictures are not used as references for encoding other pictures, so a still higher degree of compression can be used for B-pictures because any coding errors caused by the high compression will not be propagated to other pictures.

Although the MPEG specification allows for flexibility in the allocation and dependencies of I, P and B pictures, these allocations are generally fixed for a particular system.

It has also been proposed that the MPEG specification could be modified so that B-pictures could be derived from only a single other (preceding or following) I-picture or P-picture. Furthermore, it has been proposed that the number (one or two) and relative position (preceding or following position) of pictures used in the derivation of a B-picture could be made variable from picture to picture, or even from macroblock to macroblock within a B-picture. In particular, it has been proposed that the choice could be made by comparing the coding errors which would result from deriving a B-picture from the three possible picture sources described above (i.e. a preceding picture only, a following picture only, or a preceding and a following picture).

It is a constant aim in the field of video compression and an object of this invention to improve the degree of data compression which can be obtained.

SUMMARY OF THE INVENTION

This invention provides video data compression apparatus in which input data representing at least portions of a picture can be encoded by generating motion data representing image motion between that picture and at least two different sets of one or more reference pictures, the apparatus comprising:

means for comparing test data indicative of the quantity of motion data required for encoding with respect to the sets of reference pictures; and means responsive to the comparing means for selecting the set of reference pictures for which the test data indicates the lowest quantity of motion data, for use in encoding the input data.

The invention recognises that the coding error rate is not the only factor relevant to the choice of how to encode a picture (e.g. in dependence on one or more other pictures). It is also important to consider the quantity of data required to encode the resulting picture, and in particular the motion vectors required for each coding scheme. This will have the effect of weighting the selection towards schemes using fewer (or more compactly encoded) motion vectors.

Therefore, in the present invention the decision on how to derive the picture in question (or a portion of it) is based at least in part on the quantity of data required to encode the motion vectors for each possible choice of reference pictures. In this way, the most favourable set of motion vectors, being the set requiring the least data to encode, can be selected. This can help to reduce the overall data rate required to encode the video signal, and so improve the degree of data compression achieved by the video compression system.

Generally for pictures derived from two surrounding reference pictures, two sets of motion vectors will be required: one to point to a preceding reference picture and one to point to a following reference picture. In other words, the quantity of data required for encoding the motion vectors will be roughly double that required to encode motion vectors pointing to a single reference picture. However, the converse of this is that if the picture can be derived by averaging two references, the picture quality will tend to be better (i.e. there will tend to be fewer encoding errors when two references are used), and particularly so in cover/uncover situations such as camera pans. Accordingly, in order to take this into account, it is preferred that the test data is also indicative of respective encoding errors obtained by encoding the input data with respect to the sets of reference pictures. In this case, it is preferred that the motion data comprises one or more motion vectors.

Preferably the motion data represents one or more motion vectors; and the test data is also indicative of the quantity of data required to encode the input data using the one or more motion vectors.

Preferably the apparatus comprises means for encoding the motion vectors so that the quantity of data required to encode a motion vector increases with increasing motion vector size. Using this technique, in one preferred embodiment, the test data for a set of reference pictures is dependent upon the size of the motion vectors corresponding to that set.

The sets of reference pictures could be selected from many different permutations of preceding or following pictures, or both. For example, the sets of reference pictures could comprise two or more sets selected from the group consisting of:

(i) only a temporally preceding picture;
(ii) only a temporally following picture; and
(iii) a temporally preceding picture and a temporally following picture.

The invention is applicable whether the pictures are fields or frames.

Preferably the input data comprises data representing a rectangular block of a picture.

This invention also provides a video data compression method in which input data representing at least portions of a picture can be encoded by generating motion data representing image motion between that picture and at least two different sets of one or more reference pictures, the method comprising the steps of:

comparing test data indicative of the quantity of motion data required for encoding with respect to the sets of reference pictures; and in response to the comparing step, selecting the set of reference pictures for which the test data indicates the lowest quantity of motion data, for use in encoding the input data.

The invention is applicable to, for example, B-pictures of an MPEG-related system, but it should be noted that the invention could equally be applied to other video compression schemes.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 is a schematic block diagram of a video compression apparatus;

FIG. 2 schematically illustrates a sequence of video fields of a video signal;

DESCRIPTION OF THE PREFERRED EMBODIMENTS

Figure 3:
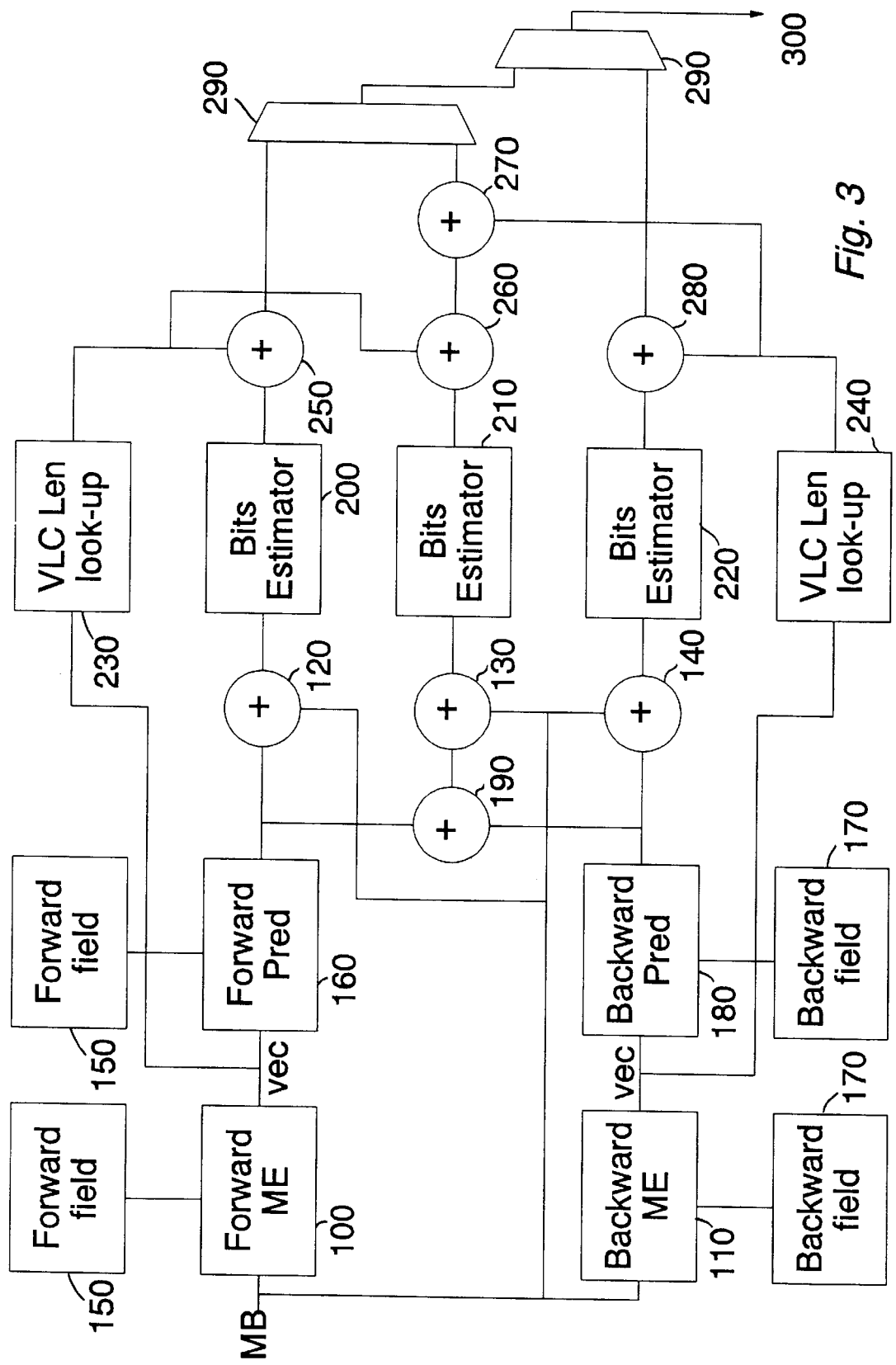
FIG. 3 schematically illustrates a decompressor.

Referring now to FIG. 1, a video signal compression apparatus comprises a frame reorderer 10, a motion estimator 20), a trial quantiser 30, a GOP delay 40, a subtracter 50, a data compressor 60 and a data decompressor 70. The apparatus receives uncompressed video data at an input terminal 80 and generates compressed video data at an output terminal 90.

Many features of the apparatus of FIG. 1 operate in a very similar manner to corresponding features of an MPEG encoder described in the specification cited above and any other documents. Such features will not be described in detail here.

Briefly, therefore, the frame reorderer 10 acts on a group of pictures (GOP) to reorder the pictures so that each picture within the GOP is compressed after those pictures on which it depends. For example, if a B-picture depends on a following P- or I-picture (in the display order of the pictures), it is reordered to be compressed after that P- or I-picture.

For some of the pictures (B-pictures), a selection is made on a macroblock-by-macroblock basis as to how the data of the B-picture should be encoded. Broadly, the choice is between encoding with respect to only a preceding I- or P-picture, only a following I- or P-picture, or both of a preceding and a following I- or P-picture. (This selection is made within the data decompressor 70, to be described in more detail below).

The trial quantiser performs a trial compression on at least part of the video data of each GOP, to assess a suitable quantisation factor for use in the final compression of the video data. The GOP delay 40 is used to allow the trial quantisation to occur before the final compression process is applied to pictures of a GOP.

The pictures of a GOP are finally compressed by the compressor 60. For an I-picture, the encoding is formed using only intra-picture techniques, so the I-picture is supplied directly from the GOP delay 40 to the compressor 60 (i.e. a zero input is supplied to the subtracting terminal 55 of the subtracter 50). The I-picture is compressed by the compressor 60 using a quantisation factor derived with reference to the trial quantiser 30, and is supplied as a compressed I-picture at the output terminal 90.

P- and B- pictures are encoded with respect to pictures which have already been encoded by the final compressor 60. In fact, for these pictures, it is the difference between a picture and predicted versions of the one or more pictures on which it depends which are encoded. To achieve this, the picture for encoding is supplied to the subtracter 50 from the GOP delay 40, and predicted versions (i.e. encoded and subsequently decoded by the decompressor 70) of the picture or pictures on which it depends are supplied to the subtracting input 55 of the subtracter 50. The output of the subtracter 50 is therefore a difference signal, which is then compressed by the compressor 60.

As part of the operation of the compressor 60, motion vectors representing image motion between a current macroblock and blocks of other pictures from which the current macroblock is derived are encoded as variable length codes such as Huffman codes. The VLC coding process follows the usual pattern in which smaller, more commonly occurring motion vectors arc encoded to form shorter VLC codes, and larger, less commonly occurring motion vectors arc encoded to form longer VLC codes.

FIG. 2 is a schematic diagram illustrating a sequence of fields f1. . . f6 of a video signal. Time is represented along a horizontal axis from left to right.

In FIG. 2 it is assumed that a field f3 is a B-picture to be derived from preceding and/or following fields or frames. Several derivations are possible. For example, f3 could be derived from:

f1 (preceding field of the same polarity)
f2 (preceding field of the opposite polarity)
(f1+f2) (preceding frame)
f5 (following field of the same polarity)
f6 (following field of the opposite polarity)
(f5+f6) (following frame)
f1 and f5 (preceding and following fields of the same polarity)

and other permutations. Also, derivations from fields or frames which are not temporally adjacent to the current field could be considered.

Figure 5:
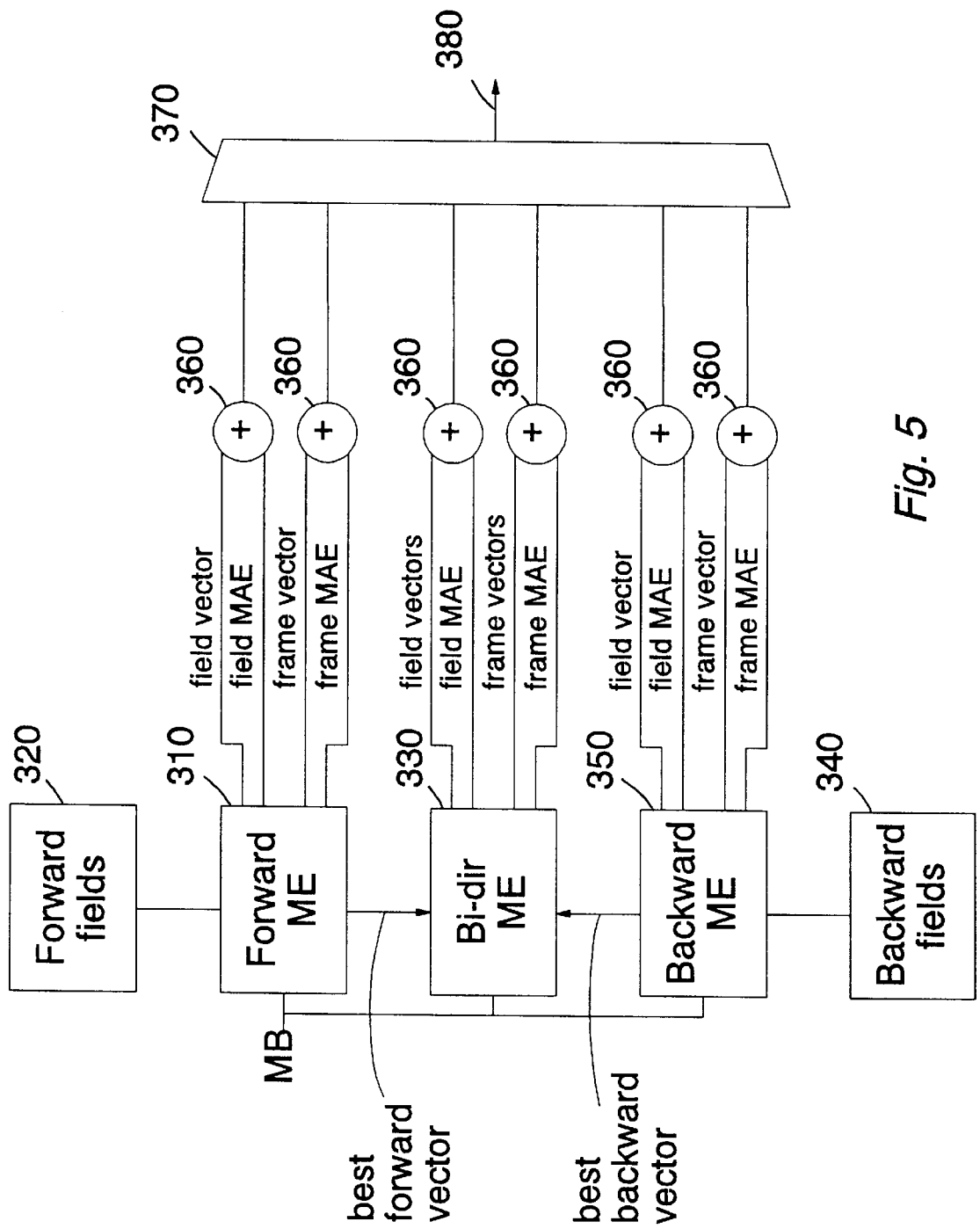
FIG. 5 schematically illustrates a picture selector.

Accordingly, it is possible for a dynamic choice to be made between all or a subset of these possibilities. In FIG. 3, for clarity of the diagram, only three choices are considered: these are two types of uni-directional prediction from a single field of the same polarity, and bi-directional prediction from surrounding fields of the same polarity. In FIG. 5, frame-based derivation is also tested.

In FIGS. 3 and 5 the selection is made on a macroblock-by-macroblock basis (where a macroblock is typically a block of 16×16 (luminance) pixels). By choosing a coding scheme for each macroblock individually, the most appropriate scheme for different parts of the picture can be selected. Also, the hardware requirements are reduced, since it is not necessary to examine all of the picture at a time to select a coding scheme. However, in other embodiments, the coding scheme could be selected on the basis of an examination of the coding performance of the whole picture, or the scheme for an entire picture could be selected by testing the coding performance of only a subset of the picture (e.g. one macroblock).

FIG. 3 is a schematic diagram of a part of the data decompressor 70. (In actual fact, some features of FIG. 3, in particular the motion estimators 100, 110 and the field stores 150, 170 to be described below are not found in the decompressor 70, but are included in FIG. 3 all the same to assist in explanation of the picture selection techniques).

Each B-picture to be compressed is treated as a series of separate macroblocks (MB). A macroblock is supplied in parallel to a forward motion estimator 100, a backward motion estimator 110 and adders 120, 130 and 140.

The forward motion estimator 100 compares the current macroblock with blocks at the same and surrounding positions in a temporarily following (source) I- or P-picture 150, to generate one or more motion vectors representing the motion of the contents of that macroblock between the current and following image.

A forward predictor 160 then uses that motion vector and data representing the forward field 150 to predict the contents of the current macroblock from the forward field. The output of the prediction is supplied to the adder 120.

Similarly, the backward motion estimator 110 uses data representing the preceding I- or P-picture 170 to generate one or more motion vectors. A backward predictor 180 then uses the backward field data 170 to create a predicted version of the current macroblock which is supplied to the adder 140.

The forward-predicted and backward-predicted macroblocks are also supplied to an adder 190 in which the average of the forward and backward predictions is calculated (one-half of the sum of the forward and backward predictions). The output of the adder 190 is supplied to the adder 130.

One of the two inputs to each of the adders 120, 130 and 140 is a subtracting input, so that the output of these three adders represents the differences between the original current macroblock and the predicted macroblock generated by forward prediction (output of the adder 120), backward prediction (output of the adder 140) and by-directional prediction (output of the adder 130).

The output of each adder is supplied to a respective bits estimator 200, 210, 220 which estimates the number of bits which will be required to code the difference data for that macroblock. These operate by detecting the mean of the sum of squares of the difference between the actual and predicted macroblocks.

In parallel with this process, two VLC length look-up tables 230, 240 receive the one or more motion vectors generated by the forward and backward motion estimators 100, 110, and use the values of those vectors to look-up the length of a variable length code which will subsequently be used to encode the vectors In other words, the VLC length look-up tables do not generate the actual VLC codes to represent the vectors (this is a relatively processor-intensive task), but they simply provide the number of bits which will be required for the VLC codes.

The outputs of the bits estimators and the VLC length look-up tables are then combined by adders 250, 260, 270 and 280, according to the following table:

| | |
|---|---|
| VLC length and bits estimate for forward uni-directional prediction | output of adder 250 |
| VLC length and bits estimate for backward unidirectional prediction | output of adder 280 |
| VLC lengths and bits estimate for bi-directional prediction | output of adder 270 |

In other words, the respective outputs of the adders 250, 270 and 280 provide indications of the number of bits which will actually be required to encode the current macroblock and associated motion vector(s) by the three possible methods under consideration (forward prediction, bi-directional prediction and backward prediction respectively). These bit counts can then be compared by comparators 290 to generate an output signal 300 specifying that one of the coding techniques which will result in the lowest bit count. The output 300 controls the operation of the apparatus of FIG. 1 to select appropriate reference pictures for use in the coding of B-pictures.

Figure 4:
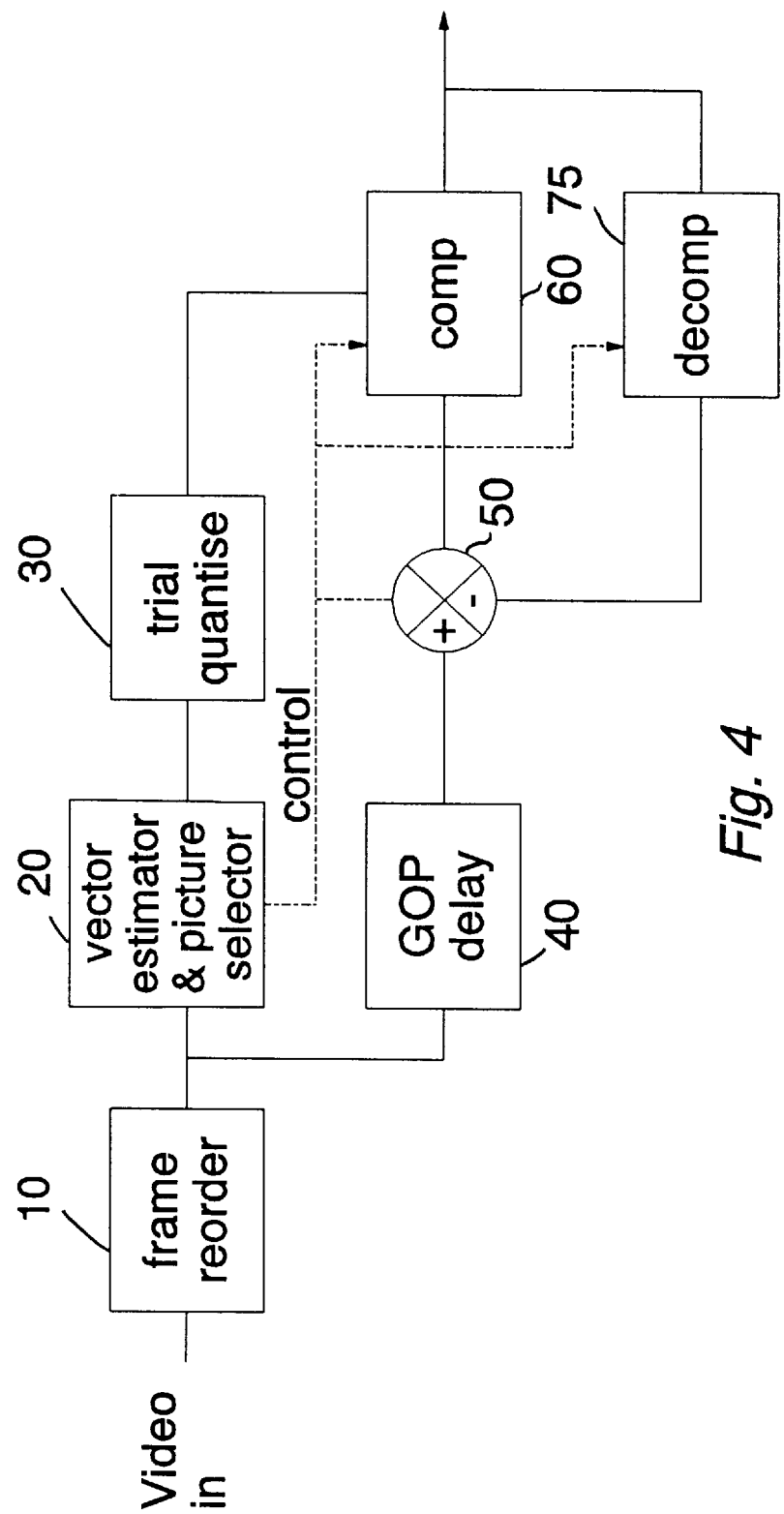
FIG. 4 is a schematic block diagram of a second video compression apparatus.

FIG. 4 is a schematic diagram of another embodiment of a video compression apparatus.

The apparatus of FIG. 4 is very similar to that of FIG. 1, and indeed many of the component parts bear the same reference numerals. However, a difference is that the decision on which reference fields to use for encoding B-pictures is made by a picture selector 20 forming part of the motion estimator. This provides a control signal to control the operation of the compressor 60, the decompressor 70 and the subtracter 50.

FIG. 5 is a schematic diagram of the picture selector 75 of FIG. 4.

In FIG. 5, a current macroblock is supplied in parallel to a forward motion estimator 310, which performs forward motion estimation with respect to forward fields 320; a backward motion estimator 350 which performs motion estimation with respect to backward fields 340, and a bi-directional motion estimator 330, which uses the "best vectors" identified in forward and backward motion estimation to perform motion estimation with respect to the forward fields 320 and the backward fields 340.

Each motion estimator produces not only motion vectors but also a mean absolute error (MAE) signal, which is (in this embodiment) the mean of absolute luminance differences between pixels at corresponding positions in the current macroblock and the block of the forward (or backward or both) image used for motion estimation. The MAE is, in effect, a by-product of the motion estimation process as described in the above reference.

In fact, each of the motion estimators produces vectors and an MAE value for field- and frame- (pairs of fields) -based motion estimation. In each case, the vectors and MAE values are passed to a respective adder 360.

The output of each adder 360 is a sum of the vector components and the MAE value for the two inputs supplied to the adder. Therefore, in this embodiment, the exact number of bits which will be required to encode the macroblock or to encode the vectors is not assessed (although this could be done using a VLC length look-up table and/or a bits estimator similar to those in FIG. 3). Instead, it is recognised that the MAE value tends to be correlated with the number of bits which will be required to encode the difference data for that macroblock, and the size of the motion vectors (or the vector magnitude) tends to be correlated with the number of bits required to encode the vector. Therefore, the respective sums of these values can be compared by a comparator 370 to generate an output signal 380 indicative of the encoding technique having the lowest sum of vector components and MAE. In this case, the output signal 380 forms the control output of the picture selector 25 of FIG. 4.

In each of the above embodiments, it will be appreciated that the choice of fields or frames to use in the coding of B-pictures can be communicated to the receiver of the compressed video data using known features of the normal MPEG data stream.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video data compression apparatus for encoding input data representing at least one portion of a picture to produce encoded input data, said encoding including generating a quantity of motion data representing image motion between said picture and at least two different sets of one or more reference pictures, generating predicted data by applying said motion data to said at least two different sets of reference pictures, and generating a quantity of error data by comparing said predicted data to said input data, said apparatus comprising:

(i) means for comparing test data indicative of the sum of the quantity of said motion data and the quantity of said error data required for encoding with respect to said sets of reference pictures, wherein said motion data includes at least one motion vector and said test data incorporates an indication of the quantity of motion data required for encoding said at least one motion vector; and (ii) means responsive to said comparing means for selecting a set of reference pictures for which said test data indicates the lowest sum of the quantity of motion data and quantity of error data.

2. Apparatus according to claim 1, in which said test data is also indicative of respective encoding errors obtained by encoding said input data with respect to said sets of reference pictures.

3. Apparatus according to claim 1, comprising:

means for encoding said at least one motion vector so that the quantity of data required to encode each said motion vector increases with increasing motion vector size.

4. Apparatus according to claim 3, in which said test data for a set of reference pictures is dependent upon the sizes of said at least one motion vector corresponding to that set.

5. Apparatus according to claim 1, in which said sets of reference pictures comprise two or more sets selected from the group consisting of:

(i) only a temporally preceding picture;

(ii) only a temporally following picture; and (iii) a temporally preceding picture and a temporally following picture.

6. Apparatus according to claim 5, in which said pictures are video fields.

7. Apparatus according to claim 5, in which said pictures are video frames.

8. Apparatus according to claim 1, in which said input data comprises data representing a rectangular block of a picture.

9. A video data compression method for encoding input data representing at least one portion of a picture to produce encoded input data, said encoding including generating a quantity of motion data representing image motion between said picture and at least two different sets of one or more reference pictures, generating predicted data by applying said motion data to said at least two different sets of reference picture, and generating a quantity of error data by comparing said predicted data to said input data, said method comprising the steps of:

(i) comparing test data indicative of the sum of the quantity of said motion data and the quantity of said error data required for encoding with respect to said sets of reference picture, wherein said motion data includes at least one motion vector and said test data incorporates an indication of the quantity of motion data required for encoding said at least one motion vector; and (ii) in response to said comparing step, selecting a set of reference pictures for which said test data indicates the lowest sum of the quantity of motion data and quantity of error data.

* * * * *